UNITED STATES PATENT OFFICE.

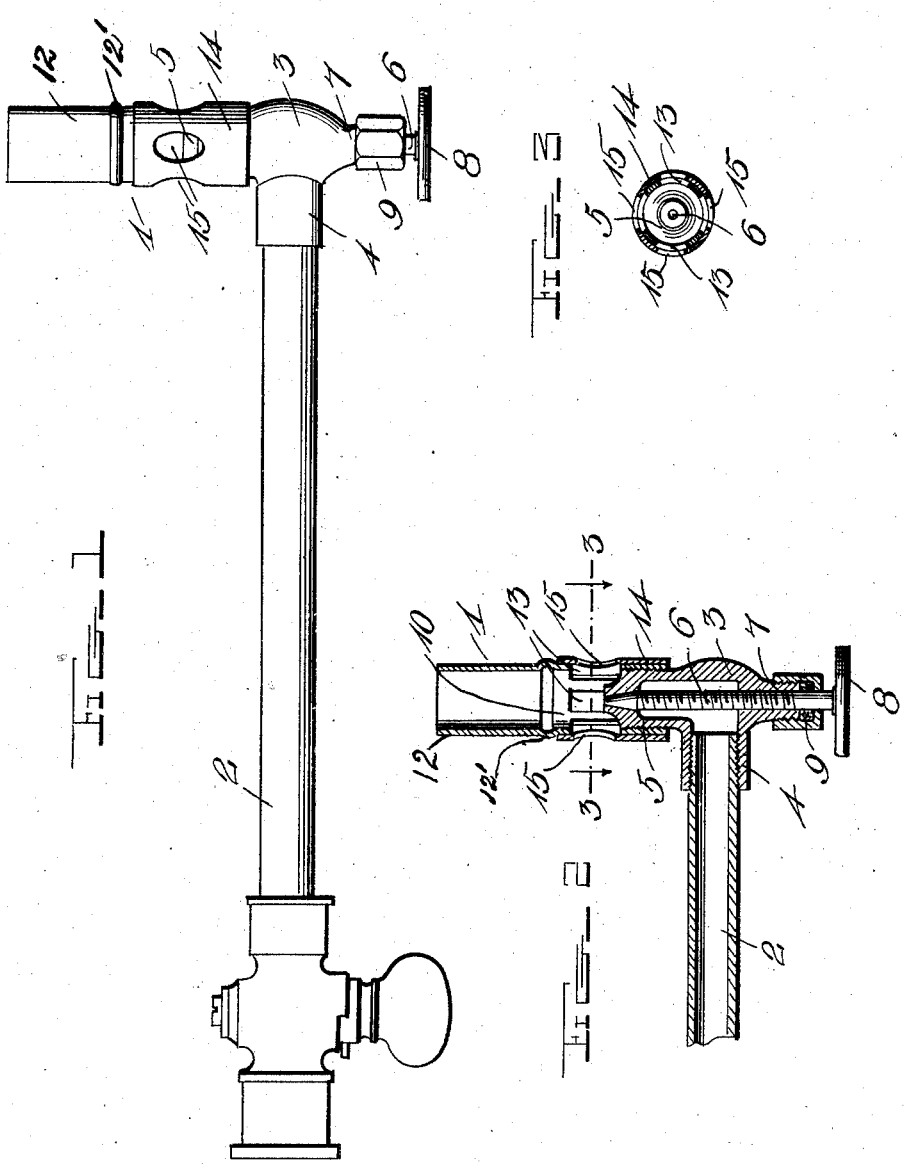

LESTER L. CARNAHAN, OF MOUNT JEWETT, PENNSYLVANIA.

GAS-BURNER VALVE.

No. 928,497.          Specification of Letters Patent.          Patented July 20, 1909.

Application filed June 25, 1908. Serial No. 440,274.

*To all whom it may concern:*

Be it known that I, LESTER L. CARNAHAN, a citizen of the United States, residing at Mount Jewett, in the county of McKean and State of Pennsylvania, have invented certain new and useful Improvements in Gas-Burner Valves; and I do declare the following to be a full, clear, and exact description of the invention, such as will enable others skilled in the art to which it appertains to make and use the same.

This invention relates to improvements in gas burner valves.

The object of the invention is to provide an improved device of this character having a needle valve for controlling the flow of gas and regulating the intensity of the light.

A further object is to provide a valve of this character having an air mixing chamber and means to regulate the admission of air thereto.

With these and other objects in view, the invention consists of certain novel features of construction, combination and arrangement of parts as will be described and particularly pointed out in the appended claim.

In the accompanying drawing, Figure 1 is a side view of a gas bracket showing my improved valve connected thereto; Fig. 2 is a longitudinal sectional view of the valve casing and mixing chamber; and Fig. 3 is a horizontal sectional view through the mixing chamber taken immediately above the needle valve.

Referring more particularly to the drawings, 1 denotes my improved burner valve which is here shown as being attached to a side bracket, 2, but which may be arranged to be attached to a chandelier or to any other form of gas bracket. The device consists of a valve chamber, 3, having formed on one side a threaded socket, 4, whereby the same is attached to the side bracket, as shown, or to any other form of gas bracket or chandelier. On the upper end of the valve chamber is arranged an exteriorly threaded valve seat, 5, with which is adapted to be engaged a needle valve, 6, which works through the valve chamber and has a screw threaded engagement therewith as shown. The stem of the valve, 6, projects through an exteriorly threaded extension, 7, formed on the lower side of the valve chamber and said stem is provided on its outer end with an operating wheel, or handle, 8. Arranged on the stem of the valve and adapted to be screwed into engagement with the threaded extension, 7, is a stuffing box, 9, which is provided to prevent any leakage between the stem of the valve and the passage through which it works in the extension, 7.

On the exteriorly threaded portion of the valve seat is screwed an air mixing chamber, 10, on the upper end of which and forming a part of the same is a tubular extension 12 adapted to receive the usual burner to which the ordinary mantle is applied. In the side wall of the mixing chamber is formed a series of air inlet apertures, 13, and around said valve chamber, over the apertures, 13, is a regulating sleeve, 14, in which is also formed a series of radially disposed apertures, 15, which, when the sleeve is turned, are adapted to be brought into alinement with the apertures, 13, of the air chamber to a greater or less extent, thereby regulating the admission of air to the mixing chamber. On the extension of the mixing chamber is provided a stop bead 12', which prevents upward movement of the sleeve 14.

By means of a valve constructed as herein shown and described, the flow of gas may be quickly and easily regulated to provide for the variations in the pressure, thereby preventing the mantle from being destroyed by an over-pressure of the gas. By adjusting the valve the intensity of the light may be also regulated. If the burner should become clogged, the same may be readily cleaned by closing the usual plug valve in the bracket or chandelier, and removing the needle valve from its casing, after which the plug valve is again opened and the pressure of gas allowed to blow out the obstruction, thus providing for the cleaning of the burner without removing the globe or the mantle.

By means of my improved needle valve, the use of the usual plug may be dispensed with, except for cleaning purposes, as the needle valve when screwed tightly on its seat will shut off the flow of gas.

By means of the air mixing chamber and its regulating sleeve, the proper amount of air may be admitted to the mixing chamber for producing the best results.

A burner valve constructed in accordance with my invention will be comparatively simple and will be found far superior to the usual form of plug valve for regulating the flow of gas to the burner.

From the foregoing description, taken in connection with the accompanying drawing, the construction and operation of the invention will be readily understood without requiring a more extended explanation.

Having thus described my invention, what I claim as new and desire to secure by Letters-Patent, is:

A gas burner comprising a valve casing with a valve seat in its upper end and also having exterior screw threads on said end, a needle valve stem for the valve seat, a mixing chamber having interior screw threads on its lower end which are connected to the screw threads on the upper end of the valve casing, said mixing chamber having a plurality of radially arranged apertures in its body portion, a regulating sleeve detachably and rotatably mounted on the mixing chamber and having a plurality of apertures in its body portion which are adapted to register with the apertures in the mixing chamber, said sleeve being also adapted to close the apertures in the mixing chamber, said mixing chamber also having an extension which is provided with a peripheral stop bead to prevent upward movement of the regulating sleeve, substantially as specified.

In testimony whereof I have hereunto set my hand in presence of two subscribing witnesses.

LESTER L. CARNAHAN.

Witnesses:
KARL R. HINES,
WALLACE L. DONAHEY.